(12) United States Patent
Logue et al.

(10) Patent No.: US 7,647,381 B2
(45) Date of Patent: *Jan. 12, 2010

(54) FEDERATED CHALLENGE CREDIT SYSTEM

(75) Inventors: Jay D. Logue, San Jose, CA (US); Richard A. Landsman, Scotts Valley, CA (US); Timothy T. Sullivan, Portola Valley, CA (US); Phillip Y. Goldman, Los Altos, CA (US); Susan Rayl Goldman, legal representative, Los Altos, CA (US)

(73) Assignee: AOL LLC, Dulles, VA (US)

( * ) Notice: Subject to any disclaimer, the term of this patent is extended or adjusted under 35 U.S.C. 154(b) by 1074 days.

This patent is subject to a terminal disclaimer.

(21) Appl. No.: 11/098,333

(22) Filed: Apr. 4, 2005

(65) Prior Publication Data

US 2006/0242244 A1 Oct. 26, 2006

(51) Int. Cl.
  *G06F 15/16* (2006.01)
(52) U.S. Cl. .................... 709/206; 709/207
(58) Field of Classification Search .......... 709/206–207
  See application file for complete search history.

(56) References Cited

U.S. PATENT DOCUMENTS

| | | |
|---|---|---|
| 4,977,520 A | 12/1990 | McGaughey, III et al. |
| 5,040,141 A | 8/1991 | Yazima et al. |
| 5,093,918 A | 3/1992 | Heyen et al. |
| 5,159,673 A | 10/1992 | Sackmann et al. |
| 5,204,961 A | 4/1993 | Barlow |
| 5,245,532 A | 9/1993 | Mourier |
| 5,283,856 A | 2/1994 | Gross et al. |
| 5,319,776 A | 6/1994 | Hile et al. |
| 5,333,266 A | 7/1994 | Boaz et al. |
| 5,377,354 A | 12/1994 | Scannell et al. |
| 5,423,042 A | 6/1995 | Jalili et al. |
| 5,448,734 A | 9/1995 | Hrabik et al. |
| 5,471,519 A | 11/1995 | Howe et al. |
| 5,473,671 A | 12/1995 | Partridge, III |
| 5,539,828 A | 7/1996 | Davis |
| 5,548,789 A | 8/1996 | Nakanura |

(Continued)

FOREIGN PATENT DOCUMENTS

DE 19708856 9/1998

(Continued)

OTHER PUBLICATIONS

U.S. Appl. No. 10/747,557, filed Dec. 29, 2003, Sullivan, et al.

(Continued)

*Primary Examiner*—Vivek Srivastava
*Assistant Examiner*—Thomas Duong
(74) *Attorney, Agent, or Firm*—Workman Nydegger

(57) ABSTRACT

Systems and methods for reducing the number of challenge messages that are sent in response to an incoming message in situations where the incoming message is likely not unsolicited. The systems and methods include evaluating the behavior of a sender with regard to one or more federated messaging services and determining if the sender is approved or unapproved. If the sender is approved, the incoming message is deliver to a recipient's inbox without issuing a challenge message. Unapproved senders are required to respond to a challenge message.

14 Claims, 4 Drawing Sheets

U.S. PATENT DOCUMENTS

| | | |
|---|---|---|
| 5,600,799 A | 2/1997 | Young et al. |
| 5,604,803 A | 2/1997 | Aziz |
| 5,608,786 A | 3/1997 | Gordon |
| 5,619,648 A | 4/1997 | Canale et al. |
| 5,627,764 A | 5/1997 | Schutzman et al. |
| 5,630,123 A | 5/1997 | Hogge |
| 5,632,018 A | 5/1997 | Otorii |
| 5,655,079 A | 8/1997 | Hirasawa et al. |
| 5,721,779 A | 2/1998 | Funk |
| 5,734,903 A | 3/1998 | Saulpaugh et al. |
| 5,742,668 A | 4/1998 | Pepe et al. |
| 5,742,769 A | 4/1998 | Lee et al. |
| 5,781,857 A | 7/1998 | Hwang et al. |
| 5,796,840 A | 8/1998 | Davis |
| 5,826,022 A | 10/1998 | Nielsen |
| 5,832,227 A | 11/1998 | Anderson et al. |
| 5,835,722 A | 11/1998 | Bradshaw et al. |
| 5,859,967 A | 1/1999 | Kaufeld et al. |
| 5,884,033 A | 3/1999 | Duvall et al. |
| 5,893,911 A | 4/1999 | Piskiel et al. |
| 5,909,589 A | 6/1999 | Parker et al. |
| 5,917,489 A | 6/1999 | Thurlow et al. |
| 5,930,479 A | 7/1999 | Hall |
| 5,937,162 A | 8/1999 | Funk et al. |
| 5,999,600 A | 12/1999 | Shin |
| 5,999,932 A * | 12/1999 | Paul ............................ 707/10 |
| 5,999,967 A | 12/1999 | Sundsted |
| 6,014,634 A | 1/2000 | Scroggie et al. |
| 6,023,723 A | 2/2000 | McCormick et al. |
| 6,052,709 A * | 4/2000 | Paul ............................ 709/202 |
| 6,055,510 A | 4/2000 | Henrick et al. |
| 6,057,841 A | 5/2000 | Thurlow et al. |
| 6,073,142 A * | 6/2000 | Geiger et al. ............... 715/205 |
| 6,092,101 A | 7/2000 | Birrell et al. |
| 6,112,227 A | 8/2000 | Heiner |
| 6,154,765 A | 11/2000 | Hart |
| 6,173,322 B1 | 1/2001 | Hu |
| 6,182,118 B1 | 1/2001 | Finney et al. |
| 6,189,026 B1 | 2/2001 | Birrell et al. |
| 6,195,698 B1 | 2/2001 | Lillibridge et al. |
| 6,199,102 B1 * | 3/2001 | Cobb ............................ 709/206 |
| 6,199,106 B1 | 3/2001 | Shaw et al. |
| 6,205,432 B1 | 3/2001 | Gabbard et al. |
| 6,226,372 B1 | 5/2001 | Beebe et al. |
| 6,230,188 B1 | 5/2001 | Marcus |
| 6,237,027 B1 | 5/2001 | Namekawa |
| 6,249,807 B1 | 6/2001 | Shaw et al. |
| 6,266,692 B1 | 7/2001 | Greenstein |
| 6,282,565 B1 | 8/2001 | Shaw et al. |
| 6,349,328 B1 | 2/2002 | Haneda et al. |
| 6,356,935 B1 | 3/2002 | Gibbs |
| 6,366,950 B1 | 4/2002 | Scheussler et al. |
| 6,373,950 B1 | 4/2002 | Rowney |
| 6,393,465 B2 | 5/2002 | Leeds |
| 6,421,709 B1 | 7/2002 | McCormick et al. |
| 6,457,044 B1 | 9/2002 | IwaZaki |
| 6,460,074 B1 | 10/2002 | Fishkin |
| 6,484,197 B1 | 11/2002 | Donohue |
| 6,546,416 B1 | 4/2003 | Kirsch |
| 6,587,550 B2 | 7/2003 | Council et al. |
| 6,625,257 B1 | 9/2003 | Asaoka et al. |
| 6,640,301 B1 | 10/2003 | Ng |
| 6,671,718 B1 | 12/2003 | Meister et al. |
| 6,678,704 B1 | 1/2004 | Bridge, Jr. et al. |
| 6,691,156 B1 | 2/2004 | Drummond et al. |
| 6,708,205 B2 | 3/2004 | Sheldon et al. |
| 6,748,422 B2 | 6/2004 | Morin et al. |
| 6,856,963 B1 | 2/2005 | Hurwitz |
| 6,868,498 B1 * | 3/2005 | Katsikas ....................... 726/14 |
| 6,880,088 B1 | 4/2005 | Gazier et al. |
| 6,883,095 B2 | 4/2005 | Sandhu et al. |
| 7,039,949 B2 * | 5/2006 | Cartmell et al. ................. 726/6 |
| 7,043,753 B2 | 5/2006 | Roddy et al. |
| 7,065,341 B2 | 6/2006 | Kamiyama et al. |
| 7,076,533 B1 | 7/2006 | Knox et al. |
| 7,085,925 B2 | 8/2006 | Hanna et al. |
| 7,120,927 B1 | 10/2006 | Beyda et al. |
| 7,136,897 B1 | 11/2006 | Raghunandan |
| 7,185,194 B2 | 2/2007 | Morikawa et al. |
| 7,185,359 B2 | 2/2007 | Schmidt et al. |
| 7,188,358 B1 | 3/2007 | Hisada et al. |
| 7,263,545 B2 | 8/2007 | Digate et al. |
| 7,346,696 B2 | 3/2008 | Malik |
| 7,383,433 B2 | 6/2008 | Yeager et al. |
| 7,512,788 B2 | 3/2009 | Choi et al. |
| 2002/0042815 A1 | 4/2002 | Salzfass et al. |
| 2002/0046099 A1 | 4/2002 | Frengut et al. |
| 2002/0046250 A1 | 4/2002 | Nassiri |
| 2002/0099781 A1 | 7/2002 | Scheussler et al. |
| 2002/0107856 A1 | 8/2002 | Scheussler et al. |
| 2002/0116641 A1 | 8/2002 | Mastrianni |
| 2002/0147726 A1 | 10/2002 | Yehia et al. |
| 2002/0152272 A1 | 10/2002 | Yairi |
| 2002/0194308 A1 | 12/2002 | Hall |
| 2002/0199095 A1 | 12/2002 | Bandini et al. |
| 2003/0009698 A1 | 1/2003 | Lindeman et al. |
| 2003/0023736 A1 | 1/2003 | Abkemeier |
| 2003/0030680 A1 | 2/2003 | Cofta et al. |
| 2003/0037103 A1 | 2/2003 | Salmi et al. |
| 2003/0037250 A1 | 2/2003 | Walker et al. |
| 2003/0065926 A1 | 4/2003 | Schultz et al. |
| 2003/0081621 A1 * | 5/2003 | Godfrey et al. ............. 370/400 |
| 2003/0086543 A1 | 5/2003 | Raymond |
| 2003/0097597 A1 | 5/2003 | Lewis |
| 2003/0110400 A1 * | 6/2003 | Cartmell et al. ............. 713/202 |
| 2003/0163691 A1 | 8/2003 | Johnson |
| 2003/0167311 A1 | 9/2003 | Kirsch |
| 2003/0167402 A1 | 9/2003 | Stolfo et al. |
| 2003/0191969 A1 | 10/2003 | Katsikas |
| 2003/0196116 A1 | 10/2003 | Troutman |
| 2003/0200267 A1 | 10/2003 | Garrigues |
| 2003/0233418 A1 | 12/2003 | Goldman |
| 2003/0236847 A1 | 12/2003 | Benowitz et al. |
| 2004/0003283 A1 | 1/2004 | Goodman et al. |
| 2004/0015554 A1 | 1/2004 | Wilson |
| 2004/0054887 A1 | 3/2004 | Paulsen, Jr. et al. |
| 2004/0087300 A1 | 5/2004 | Lewis |
| 2004/0111480 A1 | 6/2004 | Yue |
| 2004/0143633 A1 | 7/2004 | McCarty |
| 2004/0148358 A1 | 7/2004 | Singh et al. |
| 2004/0167941 A1 | 8/2004 | Prahlad et al. |
| 2004/0181581 A1 | 9/2004 | Kosco |
| 2004/0199595 A1 | 10/2004 | Banister et al. |
| 2004/0236835 A1 * | 11/2004 | Blankenship ................ 709/206 |
| 2004/0236838 A1 | 11/2004 | Tout |
| 2004/0243676 A1 * | 12/2004 | Blankenship ................ 709/206 |
| 2004/0243698 A1 * | 12/2004 | Blankenship ................ 709/224 |
| 2005/0015481 A1 * | 1/2005 | Blankenship ................ 709/224 |
| 2005/0015482 A1 * | 1/2005 | Blankenship ................ 709/206 |
| 2005/0076220 A1 * | 4/2005 | Zhang et al. ................. 713/176 |
| 2005/0076221 A1 | 4/2005 | Olkin et al. |
| 2005/0076222 A1 | 4/2005 | Olkin et al. |
| 2005/0081059 A1 | 4/2005 | Bandini et al. |
| 2005/0188045 A1 * | 8/2005 | Katsikas ...................... 709/206 |
| 2006/0059238 A1 | 3/2006 | Slater et al. |
| 2006/0101021 A1 | 5/2006 | Davis et al. |
| 2006/0112165 A9 | 5/2006 | Tomkow et al. |
| 2006/0168048 A1 | 7/2006 | Lyle et al. |
| 2007/0016641 A1 | 1/2007 | Broomhall |
| 2008/0162926 A1 | 7/2008 | Xiong et al. |

FOREIGN PATENT DOCUMENTS

| | | |
|---|---|---|
| EP | 0463252 | 1/1992 |

| | | |
|---|---|---|
| EP | 0651533 | 5/1995 |
| EP | 0686327 | 12/1995 |
| EP | 0721268 | 7/1996 |
| EP | 0725523 | 8/1996 |
| EP | 0760565 | 7/1998 |
| EP | 0883271 | 12/1998 |
| WO | 94/06236 | 3/1994 |
| WO | 96/06714 | 3/1996 |
| WO | 96/24213 | 8/1996 |
| WO | 97/14234 | 4/1997 |
| WO | 97/20423 | 6/1997 |
| WO | 97/23082 | 6/1997 |
| WO | 97/24825 | 7/1997 |
| WO | 97/26709 | 7/1997 |
| WO | 98/37675 | 8/1998 |
| WO | 99/10817 | 3/1999 |
| WO | 01/16695 | 3/2001 |
| WO | 02/077768 | 10/2002 |
| WO | 03/044617 | 5/2003 |

OTHER PUBLICATIONS

U.S. Appl. No. 11/017,461, filed Dec. 20, 2004, Landsman.
U.S. Appl. No. 11/080,240, filed Mar. 15, 2005, Logue, et al.
"Variable Envelope Return Paths." D.J. Berstein. Feb. 1, 1997. <http://cr.yp.to/proto/verp.txt>. 2 pages.
"RFC28822." P. Resnick. Qualcom Incorporated. Apr. 2001. <http:rfc.net/rfc2822.html>. 51 pages.
Federated Identity: Cementing Online Partnerships and Improving User Experience, 2004 RSA Security, Inc. [online] [retrieved on May 17, 2006]. Retrieved from the Internet: http://web.archive.org/web/20040526095021/http://www. rsasecurity.com/node.asp?id=1191(7 pgs.).
Qualcomm Inc. "Eudora MailPro Version 3.0 for Windows User Manual", Jun. 1997, 198 pages.
Simpson, W. "Request for Comments (RFC) 1994: PPP Challenge Handshake Authentication Protocol (CHAP)", published by Network Working Group, Aug. 1996, 14 pages.
U.S. Appl. No. 11/080,240, filed Mar. 15, 2005, Jay D. Logue.
U.S. Appl. No. 11/080,240, filed May 26, 2009, Notice of Allowance.
U.S. Appl. No. 11/080,240, filed Jan. 2, 2009, Pre-Interview First Office Action.
Aguilar, Rose, AOL fights to ban junk, CNETNews.com, Sep. 6, 1996, 3 pages, http://www.news.com/News/Item/0.43106,00.html.
Andrew Leonard, SpamBomers, Sep. 1997, 7 pages, Salon Magazine + about 21st + newsletter.
Bob Tiptrie, A Way to Stop Spam Messages, online, retrieved Apr. 25, 2003, 4 pages, retrieved from the internet http://groups.google.com/groups.
Cementing Online Partnerships and Improving User Experience, RSA Security, retrived online May 17, 2006, 7 pages, www.rsasecurity.com.
Chinese Abstract for CN 1117680, published Feb. 28, 1996.
CNET News.com staff, ISP: Internet Spam Provider, Feb. 18, 1997,2 pages, CNET News.com.
Cole-Gomolski, Barb, Adoption of S/MIME still lagging, May 11, 1998, 4 pages, http://www.computerworld.com/home/features.nsf/ . . . .
Controlling E-Mail Spam, online, retrieved on Mar. 28, 2003, 5 pages, retrieved from the Internet http://spam.abuse.net/adminhelp/mail.shtml.
Cynthia Dwork et al., Pricing via Processing or Combatting Junk Mail, Jul. 2002, 12 pages, Technical Report CS95-20, Matematics & Computer Science, Weizmann Institute of Science.
Cynthia Dwork, Fighting Spam May be Easier Than You Think, 1992, 30 pages, presentation given in Crypto.
Cynthia Dwork, Fighting Spam: The Science, 2004, pp. 3-4, M. Farach-Colton (Ed.): Latin 2004, LNCS 2976, Springer-Verlag Berlin.
David A. Wheeler, Countering Spam with Ham-Authenticated Email and the Guarded Email Protocol, Draft: First version Dec. 8, 2002; Released Apr. 2, 2003, 28 pages, dwheeler@dwheeler.com.
David F. Skoll, How to make Sure a human is sending you mail (was Re: Random e-mails), Nov. 15, 2006, 2 pages, news.admin.net-abuse.usenet, http://groups.google.com/group/news.admin.net-abuse.usenet/msg/e601783e8f40c54?d . . . .
Dealing with Unsolicited Commercial Email (UCE, "email spam"), 2005 Public Access Networks Corporation, online, retrieved on Jun. 06, 2006, 3 pages, retrieved from the Internet http://www.panix.com/uce.html, Copyright 2003.
Douglas G. Henke, All Hail Emperor Lewis?, online, Feb. 20, 1997,2 pages, retrived Apr. 25, 2003, retrived from the internet http://groups.google.com/groups.
Ed Foster, The Gripe Line Threatening legal action may be the quickeest way off a junk e-mailer's list, Info World Info Quote, Sep. 9, 1996, 2 pages, vol. 18, Issue 37, http://www.infoworld.com/egi-bin/siplayArchives.pl? . . . .
Foiling Spam with an Email Password System, online,retrieved on Jun. 28, 2004, 10 pages, retrieved from the Internet, http://www.uwasa.fi/~ts/info/spamfoil.html.
J. Klensin et al., IMAP/POP Authorize Extension for Simple Challenge/Response, Sep. 1997, 5 pages.
Jameson, Bob, Filter for mail not addressed to you, Jesse Berst's Anchor Desk, Sep. 6, 1996, 3 pages, http://www.news.com/News/Item/0.43106,00.html.
Janet Kornblum, Programmer Writes Spam Bomb, Aug. 6, 1997,2 pages, CNET News.com.
Julian Byrne, My Spamblock; Was: Thwarting UCE Address Culling Programs, online, Jan. 19, 1997,2 pages, retrieved Apr. 28, 2003, retrieved from the internet http://google.com/groups.
Julian Byrne, New Improved Ezspam! Was: My Spamblock . . . , online, Jan. 28, 1997,4 pages, retrieved Apr. 25, 2003, retrived from the internet, http://groups.google.com/groups.
Lorrie Faith Crano et al, Spam!, Aug. 1998, pp. 74-83, Communications of the ACM, vol. 41, No. 8.
MailCircuit's Email HandShake Verification and Spam Filter Process, online, copyright 1996-2003, 2 pages, MailCircuit.com, retrieved from the Internet http://www.mailcircuit.com/filter.htm.
Michael's Stop Junk E-Mail, Stop Junk E-mail, Nov. 17, 1996, 2 pages, http:/www.crl.com/-michaelp/stopjunkmail.html.
Mihir Bellare et al., Does Paralllel Repition Lower the Error in Computationally Sound Protocols?, 1997, 24 pages, Proceedings of the 38th Symposium on Foundations of Computer Science, IEEE.
MIT LCS, Applied Security Reading Group, by Email Sit and Kevin Fu, 2 pages, updated May 05, 2003 on the Internet http://www.pdocs.lcs.mit.edu/asrg/.
NAGS Spam Filter, 11 pages, http://www.nags.org/spamfilter.html.
Noni Naor, Verification of a Human in the Loop or Identification via the Turing Test, Sep. 1996, Cited in All On-Line Papers.
Paul Hoffman et al., Unsolicited Bulk Email: Mechanisms for Control, Internet Mail Consortium Report UBE-SOL, IMCR-2008, revised May 4, 1998,16 pages.
Paul Hoffman et al., Unsolicited Bulk Email: Mechanisms for Control, Internet Mail Consortium Report UBE-SOL, IMCR-005, Oct. 13, 1997, 31 pages.
Public Access Networks Corporation, Responding to Unsolicited Commercial Email (UCE, "email spam"), Feb. 25, 1997, 5 pages, http:www.panix.com/uce.html.
Ronald F. Guilmette, To Mung or Not to Mung, online, Jul. 24, 1997, 2 pages, retrieved Apr. 25, 2003, retrieved from the internet http://groups.google.com/groups.
Showing Full Headers of a Message, Nov. 6, 1998, 3 pages, http:/www.panix.com/headers.html.
The Penny Black Project, online, retrieved on May 8, 2006, 2 pages, retrieved from the Internet http://research.microsoft.com/research/sv/PennyBlack/.
Tim Richardson, Simple Notes on Internet Security and Email, Jun. 28, 1999, 2 pages, http:/www.timrichardson.net/security.html.
11/080,240, Aug. 21, 2009, Notice of Allowance.

* cited by examiner

Fig. 2C

Table 200B:

| Sender ID | Time Stamp | Δ Service 1 | Δ Service 2 | Δ Service 3 |
|---|---|---|---|---|
| Email 1 | | 1 | 99 | 16 |
| Email 2 | | 0 | 0 | 0 |
| Email 3 | | 0 | 0 | 0 |

- 202: Sender ID
- 204B: Time Stamp
- 206B: Δ Service 1
- 208B: Δ Service 2
- 210B: Δ Service 3
- 201A: Email 1
- 201B: Email 2
- 201C: Email 3

Fig. 3

Table 300:

| Sender ID | Time Stamp | Service 1 | Flag Service 1 | Flag Service 2 | Flag Service 3 |
|---|---|---|---|---|---|
| Email 1 | 20:49 8/3/04 | 200 | 0 | 0 | 1 |
| Email 2 | 2:58 7/16/04 | 18 | 1 | 0 | 1 |
| Email 3 | 23:19 8/2/04 | 90 | 1 | 1 | 1 |

- 302: Sender ID
- 304: Time Stamp
- 306: Service 1
- 308: Flag Service 1
- 310: Flag Service 2
- 312: Flag Service 3
- 301A: Email 1
- 301B: Email 2
- 301C: Email 3

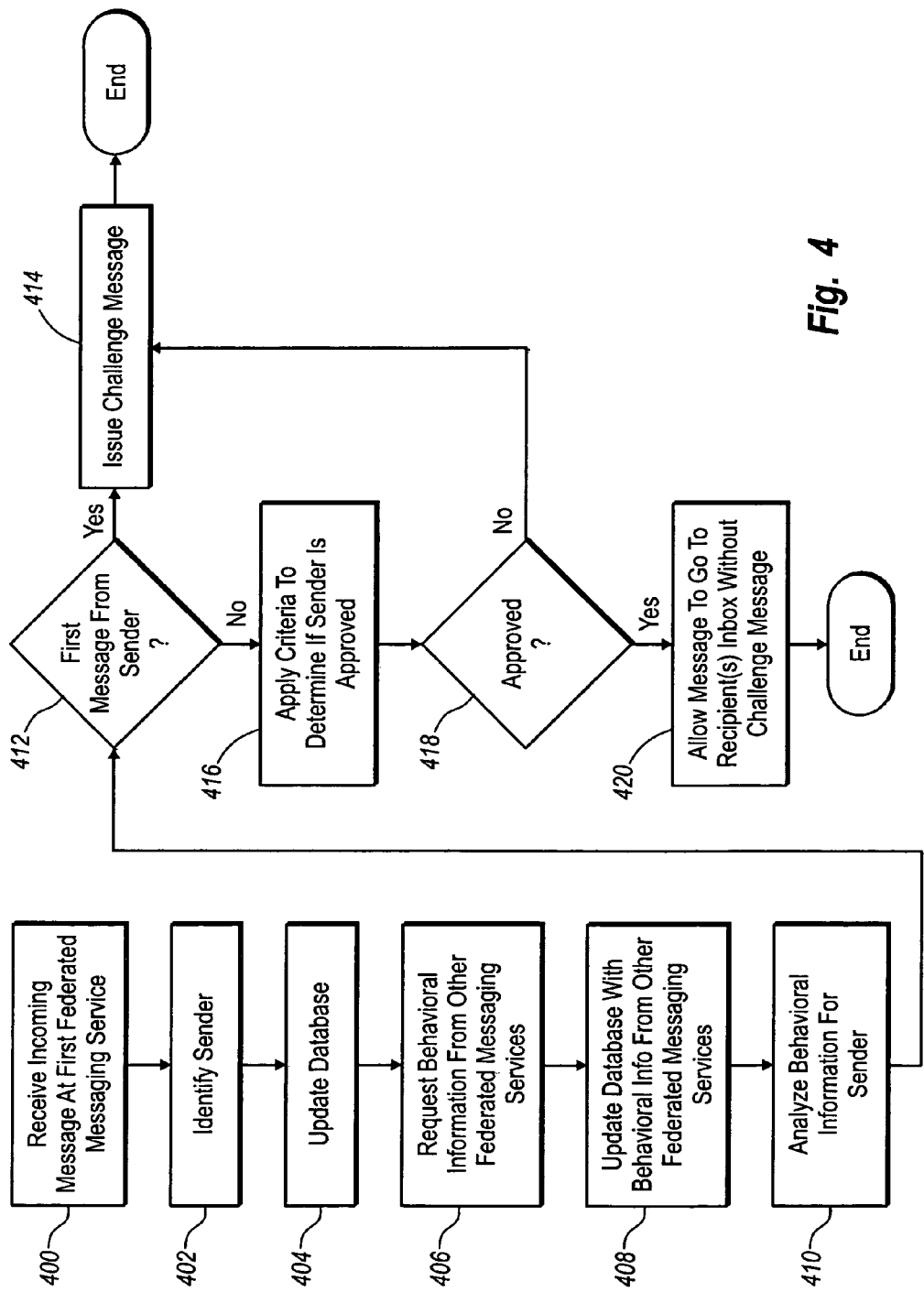

FEDERATED CHALLENGE CREDIT SYSTEM

BACKGROUND OF THE INVENTION

1. The Field of the Invention

The present invention relates generally to systems and methods for delivering electronic messages. More particularly, embodiments of the invention related to evaluating behavioral information about senders of incoming messages and determining whether to allow incoming messages from approved senders to be delivered directly to a recipient's inbox.

2. The Relevant Technology

Electronic messaging or e-mail has become, for many people, a primary means of communication. The ease by which a person is able to send and receive an electronic message makes this form of communication extremely attractive. Unfortunately, others utilize electronic messaging to send unsolicited bulk electronic messages, better known as "spam." Unsolicited electronic messages may include commercial advertisements, political messaging, as well as pornographic solicitations. Due to the influx of unsolicited electronic messages, people have become wary of giving out their electronic addresses for fear that their address will be sold to would-be solicitors. Further, those who receive spam are often not able to successfully request removal from mass e-mailing lists. Moreover, it is difficult to ascertain who has sent unsolicited electronic messages, since solicitors often use fabricated addresses or refrain from including one altogether.

Challenge and response mechanisms have been developed as a way to filter out unwanted electronic messages. When an electronic message is directed to a recipient, the message is delivered to the recipient only if the sender is identified as being authorized to send electronic messages to the recipient. Usually, the recipient has a list of approved senders, allowing the electronic message from the approved senders to be sent to the recipient's inbox without a challenge.

However, when the sender is unknown, a challenge message is sent to the sender to verify that the sender's address is valid and that the sender is a person as opposed to a machine before delivering the sender's email to the recipient's inbox. The sender is confirmed by asking the sender to respond to the challenge message in a way that affirmatively verifies that the sender is a person as opposed to a machine. This challenge/response method is quite successful in eliminating unsolicited electronic messages that are sent by mass-mailers.

However, challenge/response systems are based on a set of rules that do not take into consideration certain scenarios situations in which it is likely that a sender is sending a legitimate email message and it is likely that a recipient would actually like to receive an incoming message from the sender. In these situations, the challenge/response system is overinclusive, meaning that the spam protection actually prevents wanted messages from being sent directly to the recipient.

BRIEF SUMMARY OF THE INVENTION

The present invention relates to making network communication more efficient by reducing the number of challenge messages that are issued. Challenge messages are typically issued to verify that the sender of an incoming message is a human before the incoming message can be delivered to a recipient's inbox. In some cases, challenge wars can occur where two crossing challenge messages are never responded to. Thus, the present invention provides for withholding challenge messages in situations where it is likely that the sender is not sending unsolicited messages.

Embodiments of the invention include identifying the sender of an incoming message and determining the behavior of the sender with respect to one or more federated messaging services. Federated messaging services generally have the ability to store behavioral information with regard to one or more senders. In addition, at least some federated messaging services are able to analyze the behavioral information of a sender with regard to one or more federated services to determine if the sender is approved or unapproved. If the sender is approved, a challenge message is withheld and the incoming message allowed to be sent directly to a recipient's inbox. Unapproved senders are issued a challenge message to which they must respond before the incoming message will be delivered to a recipient's inbox. Federated messaging services are associated with a server that can contain a behavioral evaluation module and/or a behavioral evaluation module to carry out these and other functions.

These and other features of the present invention are described in further detail below and in the appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2A through 2C illustrate an exemplary data structures for use in embodiment of the present invention;

FIG. 3 illustrates another exemplary data structure of the present invention; and FIG. 4 illustrates an exemplary method for implementing features of the present invention.

DETAILED DESCRIPTION OF EXEMPLARY EMBODIMENTS

Figure 1:
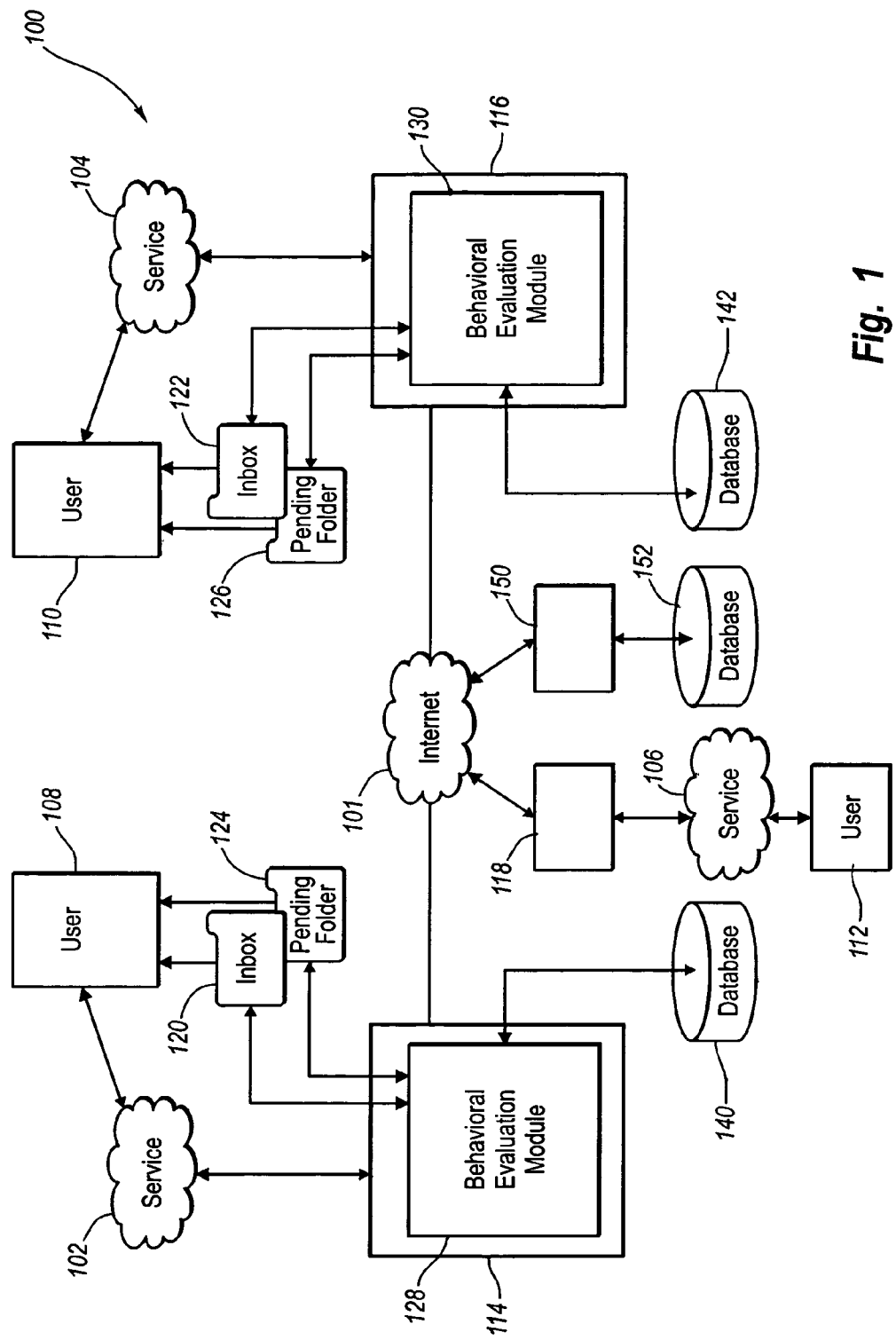
FIG. 1 illustrates an exemplary network environment for implementing embodiments of the present invention.

The present invention relates to challenge/response electronic messaging systems and methods for delivering incoming messages from a sender to a recipient's inbox in situations where the sender has exhibited behavior that indicates that the sender is likely not sending unsolicited messages. Senders who exhibit behavior indicating that the sender is likely not a spammer are referred to as "approved senders." Approved senders can become unapproved senders should they begin to exhibit behavior or trends which are considered closer to spamming than acceptable electronic messaging. Where the sender is considered well behaved or "approved," an incoming message from the sender is delivered to a recipient's inbox without applying normal filtering mechanism protocols.

For example, messaging systems implementing challenge/response mechanisms normally send challenge messages to each unidentified sender. Under the present invention, an unidentified sender could be considered to be an approved sender, wherein a challenge message is withheld and the incoming message is sent directly to a recipient's inbox. In another example, a previously identified sender may have had challenge messages withheld but begins to send a large number of electronic messages to one or more messaging services. In this situation, one or more of the message services may change the sender's status to unapproved and begin sending challenge messages to the sender as the sender's behavior indicates that there is a likelihood that the sender is sending unsolicited electronic messages.

Advantageously, the present invention simplifies the exchange of electronic messages, while still allowing filtering mechanisms to be implemented when it is likely that the sender is sending spam messages. Furthermore, embodiments of the present invention can be used to avoid "challenge wars" which can occur when two messaging services send crossing challenge messages and where the crossing challenge messages are delivered to pending folders or are deleted on each messaging service so that both parties are unaware of the challenge event. That is, in situations where a sender is approved, challenge messages are not sent in response to the sender's incoming message so that the possibility of a challenge war is eliminated. This is because where a sender is approved, it is likely that the sender is not acting like a spammer so that challenge messages do not need to be sent to block the sender's messages.

Furthermore, embodiments of the present invention provide that the behavior of a sender can be monitored across two or more messaging services so that, for example, a sender does not receive challenge messages from a messaging service if two or more messaging services agree that the sender is approved. Thus, the two or more messaging services are "federated." As used herein, the term "federated messaging service" refers to a messaging service that has implemented systems and protocols which allows a federated messaging service to monitor the behavior of one or more senders and/or determine, based on that behavior, whether a filtering mechanism should be modified in order to allow incoming messages from the sender to be sent to a recipient's inbox associated with the messaging service. The federated messaging service can also interact with other federated messaging services in order to determine whether to issue a challenge message or deliver the incoming message to the recipient's inbox.

Details of the network environment and transfer of behavioral information, and examples illustrating the present invention are provided as follows.

1. Computer Environment and Data Structure of Authorized Challenge Messages

Turning to FIG. 1, an exemplary network system 100 is illustrated in which one or more users are able to send electronic messages to each other via, e.g., the Internet 101. System 100 includes messaging services 102, 104, 106, each including client devices or user computers 108, 110, 112, respectively, each device representing a user. Each messaging service 102, 104, 106 includes, respectively, servers 114, 116, 118 which act as portals for outgoing and incoming challenge messages and other electronic messages to and from one service to another. Each server 114, 116, 118 can be connected to each other via, for example, the Internet 101. The servers 114, 116, and 118 may be, for example SMTP servers.

As used herein, the term "messaging service" refers to a system which provides electronic messaging capabilities to one or more users. Each messaging service 102, 104, 106 is generally identified by a different domain name. Each domain name is associated with one or more servers (each having an IP address). Thus, users associated with a particular messaging service will use a common domain name, but may send and receive electronic messages through multiple servers associated with the domain name. Each messaging service 102, 104, 106 thus can include one or more servers, with servers 114, 116, 118 being representative only of one of the servers associated with a domain name. Messaging services 102, 104, 106 can be an intranet, local area network (LAN), or wide area network (WAN) or any network of any size.

It will be appreciated that each server 114, 116, 118 can include the processors, databases, software, and memory required in order to fully implement a messaging system. This may include a filtering mechanism for identifying and filtering potential spam messages. Each user computer 108, 110, 112 may also include messaging programs which generate and otherwise handle electronic messages locally for each user. For example, each user computer 108, 110 can include an inbox 120, 122 and a pending folder 124, 126, respectively. Server 114, 116 can filter electronic messages and send them to the inbox or pending folder accordingly. As used herein, the term "electronic message" generally refers to an electronic message in any format such as, but not limited to, e-mail, voice mail, voice-over-IP, text messaging, instant messaging, and the like.

As defined above, one aspect of federated messaging services includes systems and protocols for determining the behavior of a sender. Thus, in one embodiment of FIG. 1, messaging services 102, 104 are "federated messaging services" since they contain a behavioral evaluation modules 128, 130 respectively, that can be implemented in, for example, servers 114 and 116, respectively. In contrast, messaging service 106 may also be a federated messaging service but is not shown as such to also illustrate that the present invention can be implemented between federated and non-federated messaging services.

Behavioral evaluation modules 128, 130 provide protocols for receiving, sending and/or storing behavioral information regarding senders and the electronic messages sent by the senders. The behavioral information can include data about one or more senders and the electronic messages that are transmitted to a particular federated messaging service. This information may also include protocols for transmitting requests to other federated messaging services for behavioral information and receiving responses to such requests. Behavioral information is stored on databases 140, 142. In addition, the behavioral evaluation modules 128, 130 include protocols for responding to requests from other federated messaging services for behavioral information. Behavioral evaluation modules 128, 130 also provide protocols for evaluating the behavioral information stored in databases 140, 142. Behavioral evaluation modules 128, 130 apply predetermined criteria for determining whether a sender should be considered approved or unapproved. The criteria for determining whether a sender should be considered approved or unapproved can also be determined dynamically Behavioral evaluation modules 128, 130 also communicate with the filtering mechanism or filtering protocol (not shown) in server 114, 116 to modify the filtering mechanism so that it does not block incoming electronic messages for approved senders.

In one embodiment, all of servers 114, 116, 118 provide electronic messaging services using a challenge/response filtering system. The challenge/response protocol can be any configuration known in the art. Generally, challenge/response protocols use challenge messages that require a human response to determine whether an unidentified sender is human as opposed to a machine by requiring the sending entity to perform a specified task that a machine is unlikely to be capable of performing. Examples of suitable challenge/response systems that can be adapted for use with the methods disclosed herein are described in U.S. patent application Ser.

No. 10/174,561, filed Jun. 18, 2002 and U.S. Pat. No. 6,199,102, issued Mar. 6, 2001, both of which are incorporated herein by reference.

However, other embodiments are contemplated in which only some of servers 114, 116, 118 implements a challenge/response filtering mechanism and the other server(s) includes another spam filtering mechanism including, but not limited to, address or white lists, or other mechanisms which sends messages from unidentified senders to a pending folder. Thus, while the present invention is directed to reducing the number of challenge messages generated by challenge/response systems, for example, where all of servers 114, 116, 118 include a challenge/response system, the present invention may also be used to avoid the situation where the challenge is unidirectional.

So, for example, server 114 of messaging service 102 can implement a challenge/response system and can include a behavioral evaluation module that can evaluate the behavioral information of senders of incoming messages to determine if the incoming message warrants a challenge message. Meanwhile, server 116 of messaging service 104 implements authorized address lists to filter unwanted mail and can include only a behavioral evaluation module that can store and transmit sender behavioral information, but does not evaluate whether a challenge message should be sent in response to incoming messages transmitted to server 116. Thus, it will be appreciated that various configurations for implementing the present invention may be possible.

Turning back to FIG. 1, when server 114 receives an incoming message the incoming message is processed by behavioral evaluation module 128. Behavioral evaluation module 128 of server 116 evaluates the incoming message to determine the identity of the sender. For example, this can be the sender's email address, phone number, or other identifying information. Sender behavioral information is parsed from the incoming message by behavioral evaluation module 128 and maintained in databases 140. If this is the first time the sender has sent incoming messages to server 114, the sender's name is added to the list of senders in database 140. If the sender has sent incoming messages previously to server 114, the database 140 updates the count of the number of incoming messages from that sender by one.

In some embodiments, the behavioral evaluation module 128 will only maintain information based on incoming messages received by server 114 and its only function is to maintain sender behavioral information and transmit that information to other federated messaging services. It is also possible that in one embodiment, behavioral evaluation module 128 may use only the behavioral information based on incoming messages sent only to server 114.

However, generally, behavioral evaluation module 128 will maintain and use behavioral information on a particular sender retrieved from one or more other federated messaging services to determine if a sender's incoming message should be allowed to go to the recipient's inbox without issuing a challenge. This includes behavioral evaluation module 128 on server 114 requesting information from federated servers 116, 118 to obtain behavioral information on one or more senders. In one embodiment, requests for behavioral information from other federate messaging services can be sent in the form of an electronic message. Similarly, responses to requests can be sent as electronic messages. As will be discussed below, a certificate authorizing server 150 communicating with a database 152 can be used to secure communications between federated messaging services. Once the behavioral information from servers 116, 118 is received, the behavioral evaluation module 128 updates database 140 with new behavioral information. The database 140 can be updated in response to an electronic message from a sender, periodically, or in any other manner.

Behavioral evaluation module 128 then analyzes the updated information or changes between the old behavioral information and updated behavioral information to determine if the sender is an approved or unapproved sender, although the behavioral evaluation module 128 can rely on existing behavioral information when necessary. Based on this determination, behavioral evaluation module 128 communicates with the filter module to inform whether or not to issue a challenge message. That is, if the sender is determined to be an unapproved sender, the behavioral evaluation module 128 allows a challenge message to be sent as normal. However, if the sender is an approved sender, the behavioral evaluation module 128 communicates with the challenge/response module to prevent a challenge message from being issued and allows the incoming message to be sent directly to the recipient's inbox.

Thus, the present invention allows an approved sender to send messages to a federated messaging service without actually requiring a challenge, yet still retains the benefits of challenge/response systems for unapproved senders to eliminate or reduce spam.

2. Maintaining and Using Behavioral Information

One aspect of the present invention is to allow federate messaging services to collaborate and share behavioral information to assist the various federated messaging services in determining whether a sender is approved or unapproved. This is beneficial, for instance, because a sender may act differently with regard to one messaging service than another. Furthermore, in some cases, a federated messaging service may receive an incoming message from a new sender and may want to determine how the sender has behaved with regards to other messaging services before allowing the incoming message to automatically be allowed to go into the recipient's inbox.

Figure 2A:
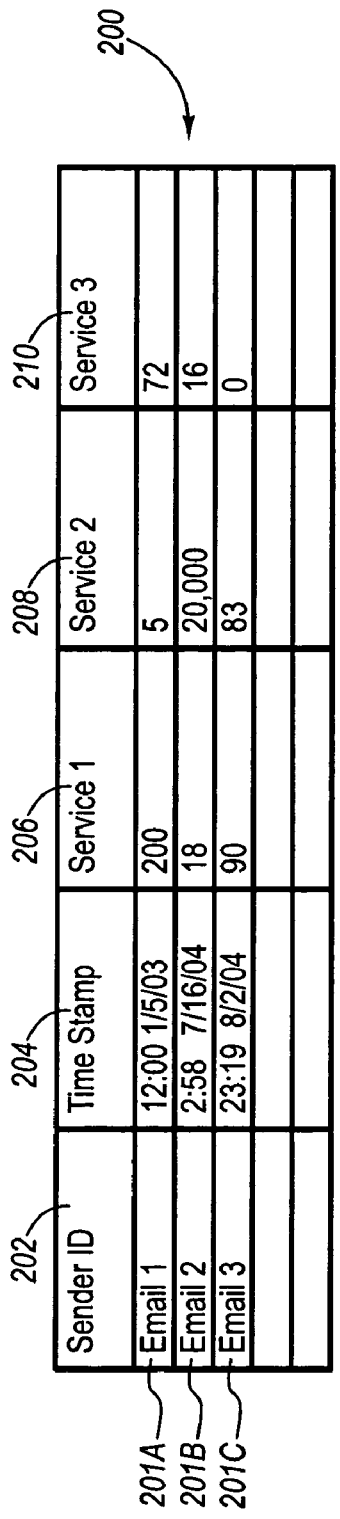

Generally, behavioral evaluation modules 128, 130 communicate with a database 140, 142, respectively to stores behavioral information of senders. In addition, the federated messaging service stores information retrieved from other federated messaging services in the database. With reference to FIGS. 2A through 3, exemplary data structures are shown in which sender behavioral information can be stored. As used herein, the term data structure is used to refer to any data structure for formatting, organizing and/or storing data. Data structures include but are not limited to, arrays, files, records, tables, trees, and the like. It will be appreciated that any of these data structures can be applied to the present invention to organize data so that it can be accessed and worked with in appropriate ways. Further, it will be appreciated that the type of information stored in the data structure will vary depending on whether the federated messaging service maintains behavioral information and/or how the behavioral information is analyzed.

FIG. 2A thus illustrates a table data structure 200 to store sender behavioral information. Data structure 200 includes columns for at least each sender (shown as senders 201A, 201B and 201C) that transmits messages to a particular federated messaging service. In embodiments where updates are received including information about senders who have not yet sent a message to that particular federated messaging service, data structure 200 can still store this information as well. Structure 200 includes a column 202 for maintaining sender identification information (e.g., email addresses), a column 204 for maintaining time stamp information for when the sender's information was last updated, and columns 206, 208, 210 for maintaining behavioral information on a particular sender from a first, second and third federated messaging service. Depending on the method used to determine a sender's approved or unapproved status, the information maintained in columns 206, 208, 210 may differ.

For example, assuming that the information is being stored on database 140 of service 102, behavioral information for senders transmitting electronic messages to service 102 is stored in column 206. Columns 208, 210 contain behavioral information for senders transmitting electronic messages to a second messaging service and a third messaging service, respectively. As shown in FIG. 2A, columns 206, 208, 210 indicate the number of messages received from each sender at each messaging service. Information in columns 208, 210 can be obtained using the behavioral evaluation module 128 to request and receive that information from another federated messaging service. In one embodiment, the server may only keep enough information to give each sender a score that can be used to determine whether a sender is approved or unapproved. The score for a particular federated messaging service can be based on information from electronic messages sent to that federated messaging service and/or information obtained from electronic messages sent to other federated messaging services.

The behavioral evaluation module 128 can request updated behavioral information from the second and third messaging service at any time. For example, when a new incoming message is received from, for example, the first sender identified in column 202, the behavioral evaluation module 128 obtains updated behavioral information from the second and third messaging services for that sender. The updated behavioral information can include only updated information for an identified sender. This can be advantageous in that responses to requests for updated information will only contain information relevant to senders that send messages to that particular federated messaging service. In another embodiment, the response may include a list of any updates to any of the senders for whom messages were received at the second or third federated messaging service 104, 106. Still, in another embodiment, the response may include a list of all senders, regardless of any changes, although this embodiment can slow down the processing speed by which the database 140 is updated.

Figure 2B:
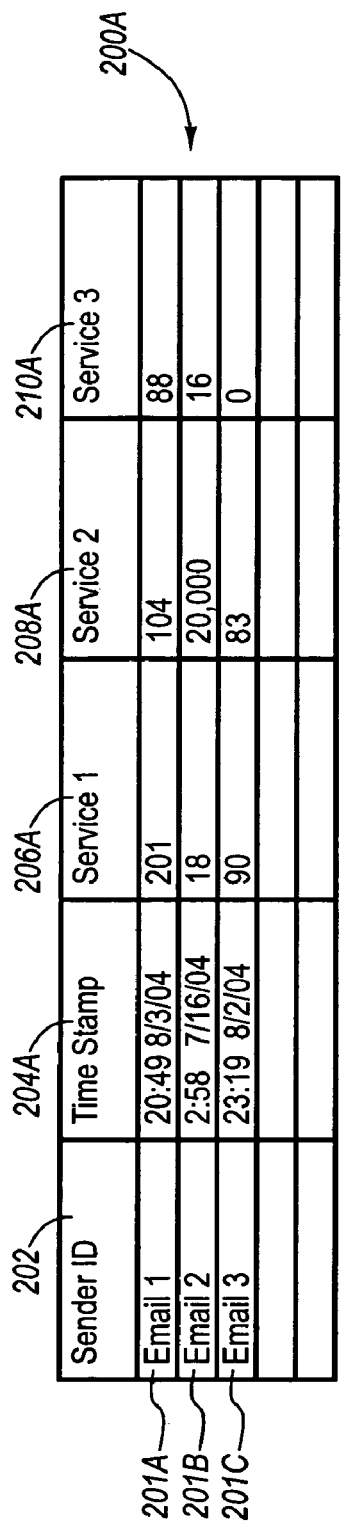

FIG. 2B illustrates an updated database structure 200A with columns 202 maintaining the sender ID column 202, time stamp column 204A, and behavioral information columns 206A, 208A, 210A for first, second and third federated messaging services. FIG. 2B can represent that the updated information is copied over the old behavioral information in FIG. 2A. Alternatively, FIG. 2B can represent that the updated information is stored in database 140 in addition to the old behavioral information to be used for comparative analysis.

FIGS. 2A and 2B illustrate one embodiment in which the criteria of whether to initiate challenge message is based on a certain number of messages received by the sender. In other words, the decision is based on a predetermined threshold number of email messages. Behavioral evaluation module 128 maintains a count of the number of messages received from each sender. In addition, by requesting behavioral information from other federated messaging services, the behavioral evaluation module can keep track of the number of messages that that sender is sending to other federated messaging services. Using this information, behavioral evaluation module 128 can calculate a total of the number of email messages combined for the three federated messaging services and compare the total to a threshold value. If the total is below the threshold value, then the behavioral evaluation module 128 communicates with the challenge/response module to withhold a challenge message. If the total exceeds the threshold value, then a challenge message is issued as normal. In this embodiment the updated information could simply overwrite the old information since the count is based on the most up to date information. This reduces the amount of storage space required to maintain behavioral information.

The following example will illustrate how this method operates. In this example, federated messaging service 102 has as a threshold value 1000 messages that a sender can transmit to all of the federated messaging services combined. Sender 201A has been identified in association with an electronic message sent to federated messaging service 102. Federated messaging service 102 subsequently obtained updated behavioral information for at least senders 201A as reflected in FIG. 2B. With regard to sender 201A, behavioral evaluation module 128 would calculate a total of 393 electronic messages sent by sender 201A to all three federated messaging services combined. Because the total of 393 messages falls below the threshold value of 1000 email messages, the behavioral evaluation module 128 would identify sender 201A as an approved sender and would allow the electronic message associated with sender 201A to be sent to the recipient's inbox without issuing a challenge message. The threshold can also represent electronic messages sent within a certain time period, such as a month for example.

FIGS. 2A through 2C illustrate another embodiment in which the criteria depends on a comparative analysis of the number of messages that are being sent now compared to the last updated information. As mentioned above, FIG. 2A represents a prior state of messaging of senders 201A, 201B and 201C while FIG. 2B represents an updated state. FIG. 2C thus shows that behavioral evaluation module 128 can create a third data structure 200B which represents the changes in the present (FIG. 2B) and prior (FIG. 2A) states. The behavioral evaluation module 128 can store both prior and present data tables and create a third data structure 200B containing the comparison information. Alternatively, behavioral evaluation module 128 could analyze the comparison information as the information is received and create a comparison table. It could also rewrite the prior information with the updated information simultaneously with analyzing the information so that the database 140 contains only the most updated information. In any event, columns 206B, 208B, 210B in FIG. 2C reflect the change in number of email messages sent by a sender rather than a cumulative number of messages.

In an example illustrating this embodiment, assume that the threshold value for federated messaging service 102 is Δ100 messages from the previous predetermined event to a present event. The predetermined event could be a fixed periodic time period, for example, 15 minutes. Behavioral evaluation module 128 would calculate a total in the change (Δ) in number of messages in columns 206, 208, 210 for a particular sender. For example, for sender 201A, the change in total number of messages sent to all the federated messaging services is 116 messages. Thus, in contrast to the previous example, the sender 201A would be issued a challenge message because the change in the number of email messages sent by the sender 201A to all of the federated messaging services has increased above the threshold level.

FIG. 3 illustrates yet another embodiment of a method for evaluating behavioral information for senders where the criteria operates on a flag or binary indicator which operates to indicate whether a sender is provisionally approved or unapproved at each federated messaging service. As used herein, the term "provisionally approved or unapproved" is used to refer to the fact that the ultimate decision of whether to send a challenge message in response to a sender's incoming message at a particular federated messaging service is generally based on an analysis of two or more federated messaging services. Thus, the flag or binary indicator servers as a behavioral indicator of whether each federated messaging service considers the sender well behaved or not. For example, a "1" may indicate that a sender is considered provisionally approved at a particular federated messaging service, but is provided with the understanding that the requesting federated messaging service will likely base the ultimate decision on more than just that federated messaging service and that the sender's behavior may be considered spamming as to other federated messaging services.

In this embodiment, a data structure 300 can be stored in, for example, database 140 containing column 302 identifying the sender (e.g., senders 301A, 301B, 301C), column 304 providing a time stamp, and column 306 tracking the number of messages that a first messaging service receives from the identified senders. In addition, data structure 300 includes columns 308, 310, 312 in which behavioral information is expressed as a flag or binary numeral such as "1" for approved sender and "0" for unapproved sender.

Generally, a first federated messaging service, for example, service 102, tracks the number of messages received from each sender in a data structure 300 in column 306. Based on a threshold value determined by that particular federated messaging service, the behavioral evaluation module 128 determines whether or not to identify the sender with a "0" or "1" flag, which is maintained in column 308. Behavioral evaluation module 128 also requests behavioral information from other federated messaging services, in this example, second and third messaging services. However, the behavioral information is provided in the form of a binary indicator "0" or "1." The flag or binary indicator for the other federated messaging services is stored in columns 310 and 312. Behavioral evaluation module 128 then analyzes the various ratings across all services for a particular sender to determine if that sender is approved or unapproved.

It will be appreciated that yes/no flags or binary indicators provide a simple analysis of approval of a sender. If, for example, any of the rating for an identified sender indicates a "0", then the ultimate rating is a "0," indicating an unapproved sender. If all of the ratings are a "1", then the ultimate rating is a "1," indicating an approved sender. This method allows each federated messaging services to base the rating flag on separate criteria, if desired. Furthermore, this method eliminates threshold values and reduces the determination to a simple binary function.

Many factors can be used in determining whether a particular federated messaging service gives a rating of "1" or a rating of "0" to a particular sender. These factors include, but are not limited to, how many electronic messages the sender sends in a given time period, how long it takes to generate each electronic message, what time of day the electronic messages are sent, how the content varies from one electronic message to the next, characteristics that suggest the electronic message was generated by a person, and the like or any combination thereof. In addition, the rating, rather than being a binary flag, can also be a score, for example, in a given range (0 to 100, for example). This enables a federated messaging service to provide a confidence level as to whether a particular sender is generating unwanted electronic messages.

In the example provided in FIG. 3, assuming the data structure 300 represents updated information, sender 301A would be unapproved because at least one of the federated services indicates a "0" or that that federated service considers the sender's behavior unsatisfactory, such that such behavior would merit a challenge message. For similar reasons, sender 301B would be unapproved. However, sender 301C is approved because all of the federated messaging services agree on the approved status of the sender.

In one embodiment, the federated messaging services apply a strict analysis of the binary indicators in that if even one of the federated messaging services considers the sender to be unapproved, all federated messaging services should require that sender to be sent a challenge message. However, it will also be appreciated that because federated messaging services may use different criteria upon which to apply the flag, it is possible that the analysis may be relaxed somewhat to allow a less stringent application of analysis. For example, a federated messaging service may allow one of the federated messaging services to consider a particular sender unapproved without sending challenge messages to the sender until two or more federated messaging services deem the sender unapproved.

In one embodiment, all of the federated messaging services use the same rating method to provide consistency across all services. This can assist in ease of implementing the present invention among various federated messaging services and providing guidelines as to what type of behavioral information to send and to store. Where services use the same rating, a user may possibly never receive a challenge message from a federated messaging service.

As suggested above, the method for rating behavioral information can be different for each federated messaging service. For example, one messaging service may allow a particular sender to send up to a total of 1000 email messages to all of the federated messaging services before requiring a challenge message to be sent. Another message service may have a threshold of 1500 combined email messages as the threshold value. Still another messaging service may base behavioral information purely on status indicators. Thus, as illustrated above, depending on how each federated messaging service rates users, a user may receive challenge messages from one service, but not the other. In the case where each messaging service uses a different method for rating senders, behavioral information that is requested may contain both numerical counts as well as status indicator information so that each messaging service will have the required information, even though some of the information may go unused.

3. Exchanging Behavioral Information

As discussed above, behavioral information can be transmitted between federated messaging services in various ways. In one embodiment, electronic messages can be sent to request information and to respond to requests. The response could contain a list of only a particular sender identified by the requesting federated messaging service. Alternatively, the response message could contain a list of any sender who has had any changes since the last request from a federated messaging service. Still, the response message could contain a list of all senders and their current message count or status indicator.

In one embodiment, the request could be automatically generated upon receiving an incoming message. Upon identifying the sender's identification, server 114 could automatically generate a request message wherein the sender's identification is contained in the body of the message. The request message could also contain a token or other identifier that indicates to the federated messaging service to whom the request message is being directed that the request is coming from another federated messaging service. Third parties may be able to intercept a response and forge behavioral information of senders in the message, which would result in inaccurate conclusions as to the behavior of the senders when the information arrives to requesting federated messaging service. Thus, authentication measures can be used to ensure that the requests/response for behavioral information is authentic as coming from a federated messaging service. Authentication techniques can include, but are not limited to, encryption, checksums, hashes, digital signature, and digital certification. Authentication may require communication between the two federated messaging services to exchange encryption keys. The authentication method and/or exchange of keys may require certificating the authenticity thereof using, for example, a certificate authorizing server 150 communicating with a database 152. Once the behavioral information from servers 116, 118 is received, the behavioral evaluation module 128 updates database 140 with new behavioral information. A token to identify federated messaging services can be implemented similar to the one taught in Co-pending U.S. patent application Ser. No. 11/080,240, filed Mar. 15, 2005, herein incorporated by reference.

In embodiments where the sender's domain name is identified in the request message, the database 140, 142 may also contain another data structure organized by domain name which contains pointers or markers to the data structure containing behavioral information. That way, the behavioral evaluation modules 128, 130 can easily determine the sender's behavioral information and generate a response message to the request.

In embodiments where the request message asks for an updated list of any changes in senders, the behavioral evaluation modules 128, 130 may have a data structure that tracks the date and time that a previous request was made by each federated messaging service. In addition, the behavioral evaluation modules 128, 130 may maintain a revolving list of changes of behavioral information. When a federated messaging service makes a request, the behavioral evaluation modules 128, 130 identifies the last time that service made a request and retrieves all of the changes in the updated list between the last request and the present request. The behavioral evaluation modules 128, 130 then updates the data structure for the federated messaging services and inserts the time of the new request. Advantageously, this allows all updated information to be deleted for times earlier then the oldest request time to minimize the amount of storage required.

Sharing behavioral information between federated messaging services can be done at various times. In one embodiment, behavioral information is requested and sent using real-time communication. Thus, the behavioral evaluation modules 128, 130 request behavioral information on each sender each time an incoming message is received at that federated messaging service. In another embodiment, a less than real-time mechanism can be implemented in which the federated messaging services at periodic intervals send an updated list of behavioral information of senders to the other federated messaging service. Advantageously, this has the advantageous of eliminating the requirement for a request for behavioral information since the federated messaging services can anticipate receiving an updated list within a certain amount of time. Preferably, in this embodiment, the federated messaging services would stagger the transmission of updated lists so that a gap would occur in the updating of all of the federated messaging services databases, closing any window of opportunity for would-be spammers. In this embodiment, potential spammers would also likely be identified because it is likely that they would send to many different messaging services and not just one.

In another embodiment, the maintenance and updating of sender behavioral information could be centralized in a server 150 to which all federated messaging services 102, 104 have access. That is, each federated messaging service could continually or periodically send the server 150 a list of changes to behavioral information. Server 150 would include a behavioral evaluation module (not shown) to receive, organize and store information on database 152. The behavioral evaluation module in the server 150 would also respond to requests from federated messaging services 102, 104 for updated behavioral lists so that each federated messaging service could make a determination of whether a sender is approved or unapproved similar to how requests are described above. In addition, if the federated messaging services 102, 104 use the same criteria for determining if a sender is approved, the behavioral evaluation module at server 150 could also apply the uniform criteria across all senders to determine if the sender is approved or unapproved. The server 150 could then respond to a request of whether a sender is approved/unapproved by sending a simple status identifier, such as. "1" for approved and "0" for unapproved. Centralizing the storage and analysis of behavioral information may reduce the requests/responses for behavioral information across federated messaging services and could serve to provide uniform criteria for determining when challenge messages should be withheld. Alternatively, the server 150 can use the behavioral information from the federated messaging services to generate a score for each sender. A score gives the federated messaging services the autonomy to determine whether or not to challenge a particular sender.

In still another embodiment, the sender's behavioral information could be embedded in an incoming message generated by the sender, as long as the sender transmits from a federated messaging service. This would eliminate both the need for a request and a response message in order to obtain the sender's behavioral information at least as to that federated messaging service. A request may still need to be made to see how that sender is behaving with respect to other federated messaging services. Thus, for incoming messages generated by federated messaging services, some of the information for these senders can be immediately provided and the receiving federated messaging service can determine what additional updates need to be made. Naturally, where the incoming message is generated by a non-federated messaging service, other methods for transmitting behavioral information described above will be appropriate.

Still, in another method an admissions token can be issued to a sender once the sender has successfully bypassed a challenge/response filtering mechanism at a first federated messaging service. The admissions token can be, for example, a public key, which the sender can include in any messages that are generated by the sender. When received by any federate messaging service, the federated messaging services use the public key to confirm that the sender is an approved sender. Upon this determination, the receiving federated messaging service allows the message into the recipient's inbox without issuing a challenge message.

If a federated messaging service discovers that a sender has never sent an incoming message to any of the federated messaging services, the federated messaging service receiving this first message from the sender may issue a challenge message to ensure that the sender is a human. However, it may also be the case that the federated messaging service allows incoming messages from first time senders to go to the recipient's inbox until the sender proves they cannot be trusted.

4. Exemplary Method

While many methods for implementing the features of the present invention have been discussed, FIG. 4 illustrates an exemplary method for implementing certain steps and features of the present invention. Those of skill in the art will appreciate that other steps or features can be added, certain steps can be eliminated, or the steps can be rearranged in a different order. In one embodiment, as illustrated in FIG. 4, at step 400, a server associated with a first federated messaging service receives an incoming message. At step 402, the behavioral evaluation module at the server analyzes the incoming message to identify the sender. At step 404, the behavioral evaluation module accesses a data structure in the database and updates the data structure to reflect the event of receiving an incoming message from the sender. At step 406, the behavioral evaluation module requests updated behavioral information for that sender from at least one other federated messaging service. At step 408, the behavioral evaluation module updates the database with behavioral information once it receives a response to the request.

At step 410, the behavioral evaluation module analyzes the behavioral information stored in the database. At step 412, the behavioral evaluation module determines if this is the first incoming message that the sender has sent to any of the federated messaging services. At step 414, the behavioral evaluation module communicates with the challenge/response module instructing that a challenge message be sent. If this is not the first time that the sender has sent a message to any of the federated messaging services, at step 416, the behavioral evaluation module applies the criteria for determining if the sender is approved or unapproved for that federated messaging service. As discussed above, the criteria may be based on a threshold number of messages received by a sender or a threshold amount in the increase of messages received by the sender or on other criteria. For example, the criteria could be based on the status indicator that each federated messaging service determines for a particular user.

At step 418, the behavioral evaluation module determines, based on it analysis if the sender is approved or unapproved. If the sender is unapproved, the process goes to step 414, where a challenge message is issued. If the sender is approved, at step 420, the behavioral evaluation module communicates with the challenge/response module to withhold a challenge module and allow the incoming message to be sent directly to the recipient's inbox.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a first server included in a first electronic messaging system capable of receiving electronic messages, the first server associated with a first database, a method of determining whether an incoming electronic message should initiate a filter mechanism, the method comprising:

at a first server associated with a first electronic messaging system identified by a first domain name,
receiving an incoming message;
identifying a first sender associated with the incoming message;
maintaining behavioral information about the first sender on a database associated with the first server associated with the first electronic messaging system;
issuing a request to a second server associated with at least a second electronic messaging system, the second electronic messaging system being identified by a second domain name that is different than the first domain name of the first electronic messaging system, wherein the request includes a federated token that allows the second server associated with at least the second electronic messaging system to respond to the request for the behavioral information without issuing a challenge to the first server associated with the first electronic messaging system;
receiving a response containing behavioral information for at least the first sender from the second server associated with at least a second electronic messaging system;
parsing the behavioral information from the response;
applying predetermined criteria to the behavioral information stored in the database and the behavioral information parsed from the second server associated with at least the second electronic messaging system to determine if the sender is approved or unapproved;
sending the incoming message directly to a recipient's inbox if the sender is determined to be approved; and
initiating a filter mechanism if the sender is determined to be unapproved.

2. The method as recited in claim 1, wherein applying predetermined criteria to the updated behavioral information to determine if the sender is approved comprises at least one of:

evaluating a number of messages that the first sender has transmitted to at least the first electronic messaging system and the second electronic messaging system;
evaluating a change in the number of messages that the first sender has transmitted to at least the first electronic messaging system and the second electronic messaging system, the change being measured from a previous state to a present state;
evaluating a binary indicator from at least the first electronic messaging system and a second electronic messaging system, the binary indicator representing whether the sender is provisionally approved or unapproved at each of the first electronic messaging system and the second electronic messaging system; or
evaluating a score from at least the first electronic messaging systems and the second electronic messaging system, the score representing a confidence level regarding the sender.

3. The method as recited in claim 1, wherein receiving a response containing behavioral information for at least the first sender from the second server associated with at least the second electronic messaging system comprises at least one of:

receiving behavioral information for only the first sender; or
receiving behavioral information for any sender who has sent electronic messages to the second electronic messaging system whose behavior has changed since the most recent transmission of behavioral information from the second server associated with at least the second electronic messaging system to the first server associated with the first electronic messaging system.

4. The method as recited in claim 1, further comprising storing the behavioral information from the second server associated with at least the second electronic messaging system on the database associated with the first server associated with the first electronic messaging system.

5. The method as recited in claim 1, further comprising sending behavioral information about the sender to the second server associated with at least the second electronic messaging system.

6. The method as recited in claim 1, wherein:
the second server is associated with only the second electronic messaging system capable of receiving electronic messages; or
the second server serves as a central repository for behavioral information from servers associated with two or more electronic messaging services, including the second electronic messaging system.

7. The method as recited in claim 1, wherein applying predetermined criteria to the behavioral information stored in the database and the behavioral information received from the second server associated with at least the second electronic messaging system to determine if the sender is approved or unapproved comprises concluding that a sender is unapproved if the behavioral information from any of the other electronic messaging systems indicates that the sender is unapproved.

8. In a network including two or more electronic messaging systems capable of receiving electronic messages, a method of determining whether an incoming electronic message to one of the two or more electronic messaging systems should initiate a filter mechanism, the method comprising:
at a first electronic messaging system:
tracking behavioral information for one or more senders that send electronic messages to two or more distinct electronic messaging systems, each electronic messaging system being defined by a distinct domain name;
issuing a request for behavioral information of the one or more senders to a second electronic messaging system, wherein the request includes a federated token that allows the second electronic messaging system to respond to the request for the behavioral information without issuing a challenge to the first electronic messaging system, wherein the behavioral information is expressed as a binary indicator generated for each of the one or more senders to represent whether the one or more senders is provisionally approved or unapproved at each of the electronic messaging systems;
evaluating the sender behavioral information for one or more senders to determine whether each sender is approved or unapproved, including evaluating binary indicators for two or more electronic messaging systems;
sending incoming messages from a sender directly to a recipient's inbox if the sender is determined to be approved; and
initiating a filter mechanism in response to an incoming message from the sender if the sender is determined to be unapproved.

9. The method as recited in claim 8, wherein tracking behavioral information for one or more senders comprises at least one of:
maintaining the behavioral information in a data structure associated with each electronic messaging systems; or
maintaining the behavioral information in a data structure associated with a server to which each electronic messaging system has access.

10. The method as recited in claim 8, evaluating the sender behavioral information for one or more senders to determine whether each sender is approved or unapproved comprises exchanging behavioral information of senders between at least two electronic messaging systems.

11. The method as recited in claim 10, wherein exchanging behavioral information of senders between at least two electronic messaging systems comprises at least one of:
the first electronic messaging system requesting behavioral information of only one of the senders from the second electronic messaging system and the second electronic messaging system transmitting the behavioral information of that sender in response to the request;
the first electronic messaging system requesting behavioral information of two or more senders from the second electronic messaging system and the second electronic messaging system transmitting the behavioral information of the two or more senders in response to the request;
the second electronic messaging system transmitting behavioral information at predetermined intervals; or
the second electronic messaging system generating the incoming message to be sent to the first electronic messaging system and embedding the behavioral information of the sender in the incoming message.

12. The method as recited in claim 8, wherein evaluating the sender behavioral information for one or more senders to determine whether each sender is approved or unapproved comprises comparing the behavior of a particular sender against behavior that is considered unsolicited.

13. A method for determining whether to initiate a filter mechanism in response to an electronic message from a sender, the method comprising:
at a first federated server associated with a first electronic messaging system identified by a first domain name,
receiving an electronic message from the sender;
issuing a request for behavioral information of the sender to a second federated server associated with a second electronic messaging system identified by a second domain name different from the first domain name, wherein the request includes a federated token that allows the second electronic messaging system to respond to the request for the behavioral information;
evaluating the sender of the electronic message based on behavioral information received from the second federated server to determine a score for the sender, the score representing a confidence level of whether the sender is approved or unapproved;
sending the electronic message from the sender directly to a recipient's inbox if the sender is determined to be approved; and
initiating a filter mechanism in response to the electronic message from the sender if the sender is determined to be unapproved.

14. A method as defined in claim 13, wherein the score is based on at least two of:
the number of electronic messages the sender sends in a given time period;
the amount of time required to generate each electronic message;
the time of day the electronic messages are sent;
the variation in content from one electronic message to the next; or
characteristics that suggest the electronic message was generated by a person.

* * * * *

UNITED STATES PATENT AND TRADEMARK OFFICE
CERTIFICATE OF CORRECTION

PATENT NO. : 7,647,381 B2
APPLICATION NO. : 11/098333
DATED : January 12, 2010
INVENTOR(S) : Logue et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1281 days.

Signed and Sealed this

Twenty-eighth Day of December, 2010

David J. Kappos
*Director of the United States Patent and Trademark Office*